(12) United States Patent
Hora

(10) Patent No.: US 10,410,752 B2
(45) Date of Patent: Sep. 10, 2019

(54) METHOD FOR GENERATING ELECTRICAL ENERGY BY LASER-BASED NUCLEAR FUSION AND LASER REACTOR

(71) Applicants: UJK Management GMBH, Poing (DE); Heinrich Hora, Poing (DE)

(72) Inventor: Heinrich Hora, Poing (DE)

(73) Assignees: UJK Management GMBH, Poing (DE); Heinrich Hora, Poing (DE)

( * ) Notice: Subject to any disclaimer, the term of this patent is extended or adjusted under 35 U.S.C. 154(b) by 279 days.

(21) Appl. No.: 15/126,740

(22) PCT Filed: Dec. 5, 2014

(86) PCT No.: PCT/EP2014/003281
§ 371 (c)(1),
(2) Date: Sep. 16, 2016

(87) PCT Pub. No.: WO2015/144190
PCT Pub. Date: Oct. 1, 2015

(65) Prior Publication Data
US 2017/0125129 A1    May 4, 2017

(30) Foreign Application Priority Data
Mar. 23, 2014   (DE) .................. 10 2014 004 032

(51) Int. Cl.
*G21B 1/05*    (2006.01)
*G21B 1/23*    (2006.01)
(Continued)

(52) U.S. Cl.
CPC ............... *G21B 1/23* (2013.01); *G21B 1/03* (2013.01); *G21B 1/05* (2013.01); *G21B 1/19* (2013.01);
(Continued)

(58) Field of Classification Search
CPC ..... G21B 1/23; G21B 1/03; G21B 1/05; G21B 1/19; G21B 3/006; G21D 7/00
(Continued)

(56) References Cited

U.S. PATENT DOCUMENTS

2019/0066851 A1*  2/2019 Perkins ................... G21B 1/19

FOREIGN PATENT DOCUMENTS

DE           10208515 A1    10/2003
DE       102012001634 A1     8/2013

OTHER PUBLICATIONS

Honrubia, "Three-dimensional fast electron transport Three-dimensional fast electron transport for ignition-scale inertial fusion capsules", Nucl. Fusion 46 (2006) L25-L28. (Year: 2006).*
(Continued)

*Primary Examiner* — Jack W Keith
*Assistant Examiner* — Daniel Wasil
(74) *Attorney, Agent, or Firm* — Kenneth E. Horton; Kirton McConkie

(57) ABSTRACT

A method for generating electrical energy, comprising the steps of providing a fusion fuel (1), the fusion fuel (1) being held in a magnetic field within a cylindrical reaction chamber (2), initiating nuclear fusion in the fusion fuel (1), in which a fusion flame is produced by fusion laser pulses (4) having a pulse duration of less than 10 ps and a power of more than 1 petawatt, and converting the energy that is released during the nuclear fusion from the nuclei that are produced into power plant power, wherein the magnetic field has a field strength which is greater than or equal to 1 kilotesla and the nuclear fusion has an energy yield of more than 500 per laser energy of the fusion laser pulses (4) that produce the fusion flame. Also described is a nuclear fusion reactor which is configured for generating electrical energy.

9 Claims, 2 Drawing Sheets

(51) Int. Cl.
G21B 1/03 (2006.01)
G21B 3/00 (2006.01)
G21B 1/19 (2006.01)
G21D 7/00 (2006.01)

(52) U.S. Cl.
CPC .............. *G21B 3/006* (2013.01); *G21D 7/00* (2013.01); *Y02E 30/14* (2013.01)

(58) Field of Classification Search
USPC .................................................. 376/103, 122
See application file for complete search history.

(56) References Cited

OTHER PUBLICATIONS

Schultz, "Inertial fusion target development", In Fusion Engineering, 1995. SOFE'95. Seeking a New Energy Era., 16th IEEE/NPSS Symposium, vol. 1, pp. 116-123. IEEE, 1995. (Year: 1995).*
Cuneo, "Magnetically Driven Implosions for Inertial Confinement Fusion at Sandia National Laboratories", IEEE Transactions on Plasma Science, vol. 40, No. 12, Dec. 2012, pp. 3222-3245. (Year: 2012).*
Slutz, "The design and simulation of high-voltage Applied-B ion diodes for inertial confinement fusion", Journal of applied physics 61.11 (1987) 4970-4977. (Year: 1987).*
J. Nuckolls and L. Wood, Edward Teller Lectures Laser and Inertial Fusion Energy, London 2005, Citation 25 on p. 13, H. Hora and G.H. Miley, Imperial College Press.
H. Hora, Physics of Laser Driven Plasma, Wiley, New York 1981, FIgures10.18 a & b.
R. Sauerbrey, Physics of Plasmas, 1996 American Institute of Physics, vol. 3 , Dec. 1996, pp. 4712-4716.
H. Hora et al., Fast Ignition by Laser Driven Particle Beams of Very High Intensity, Physics of Plasma 14, Jul. 27, 2001 (2007).
H. Hora, Laser Fusion With Nonlinear Force Driven Plasma Blocks; Thresholds and Dielectric Effects, Laser and Particle Beams (2009), 27, 207-222.
H. Hora et al., Fiber ICAN Laser with Exawatt-picosecond Pulses for Fusion without Nuclear Radiation Problems, Laser and Particle Beams (2014), 32, 63-68.
M. Hohenberger et al., Inertial Confinement Fusion Implosions with Imposed Magnetic Field Compression Using the OMEGA Lasera, Physics of Plasmas (1994-present).
Fujioka et al., Kilotesla Magnetic Field Due to a Capacitor-Coil Target Driven by High Power Laser, Scientific Reports 3, 1170 (2013), published Jan. 30, 2013.
K.W. Kanngiesser, Application of HVDC for Large Power System Interconnections, Hochspannungsgleichstromubertagung-Systeme und ihre Planung, EV HA 7, Siemens Monographien, Munich (1994).
Gotchev O et al., Seeding Magnetic Fields for Laser-Driven Flux Compression in High-Energy-Density Plasmas, Review of Scientific Instruments, AIP, Melville, NY, US, vol. 80, No. 4, Apr. 14, 2009.
Fujioka et al., High-Energy-Density Plasmas Generation GEKKO-LFEX Laser Facility Forfast-Ignition Laser Fusion Studies and Laboratory Astrophysics, Plasma and Physics and Controlled Fusion, vol. 54, No. 12, Nov. 21, 2012.
Gotchev O et al., Magneto-inertial Approach to Direct-drive Laser Fusion, Journal of Fusion Energy, Kluwer Academic Publishers-Plenum Publisher, NE, vol. 27, No. 1-2, Aug. 14, 2007, pp. 25-31.

* cited by examiner

METHOD FOR GENERATING ELECTRICAL ENERGY BY LASER-BASED NUCLEAR FUSION AND LASER REACTOR

TECHNICAL FIELD

The invention relates to a method for generating electrical energy, which is based on the fusion of protons with the boron isotope 11 using laser radiation and magnetic fields and converting the energy that is released during the fusion into electrical energy. The invention also relates to a laser fusion reactor, which is configured for generating electrical energy by means of the laser-based fusion of protons with the boron isotope 11. Uses for the invention are provided in the field of electric power generation.

PRIOR ART

In the e description of the prior art, reference is made to the following publications:
[1] J. Nuckolls and L. Wood, Citation 25 on p. 13 of H. Hora and G. H. Miley *Edward Teller Lectures Laser and Inertial Fusion Energy.* Imperial College Press, London 2005;
[2] H. Hora, *Physics of Laser Driven Plasma* Wiley, N.Y. 1981, FIGS. 10.18 a & b;
[3] R. Sauerbrey, Physics of Plasmas 3, 4712 (1996);
[4] H. Hora, J. Badziak et al. Physics of Plasmas 14, 072701 (2007);
[5] H. Hora, Laser and Particle Beams 27, 207 (2009);
[6] H. Hora et al. Laser and Particle Beams 32, 63 (2014);
[7] M. Hohenberger, P. Z. Chang et al. Physics of Plasmas 19, 056306 (2012);
[8] S. Fujioka et al. Scientif. Reports 3, 1170 (2013), published 30 Jan. 2013;
[9] K. W. Kanngiesser, D. H. Huang and H. Lips, Hochspannungsgleichstromübertragung—Systeme and ihre Planung. EV HA 7, Siemens Monographien, Munich (1994).

The most frequently used method of producing energy involves the burning of fossil fuels that contain carbon. For more than 200 years, the burning of fossil fuels has formed the basis for technological progress and economic prosperity. As a disadvantage, however,this process releases the combustion product carbon dioxide into the atmosphere, which can lead to undesirable changes in global climate.

Another method for producing energy is based on nuclear fission, in which the nuclear energy that is released is converted first into heat and then into electrical energy. Although the operation of nuclear power plants is economical, it has the disadvantage that the disposal of radioactive waste is costly and risky. Furthermore, it involves the operational risk that a power plant accident can result in extreme, catastrophic damage.

Nuclear energy can also be released by nuclear fusion, in which lighter atomic nuclei are fused to form heavier atomic nuclei, releasing the energy $E=mc^2$ (m: nuclear mass defect m, c: speed of light) in the extremely high range of approximately 10 MeV per fusion reaction. However, with the exception of natural processes occurring in stars, nuclear fusion has heretofore been realized only in an uncontrolled manner in the form of exploding a fusion bomb. Controllable fusion power plants have been in development for decades, however despite major research efforts, they have not yet been successfully implemented in practice.

A fusion reaction which has been comprehensively studied is based on the fusion of the heavy hydrogen deuterium (D) with the super heavy hydrogen tritium (T) (D-T fusion). However, this fusion reaction is characterized by the undesirable production of radioactive radiation which results from the conversion, with neutrons, of initially non-radiative nuclei of harmless, non-radioactive materials into radioactive isotopes, e.g. within a reactor vessel.

All known methods for the controlled generation of nuclear fusion energy have a yield of less than 500 (energy produced per laser energy expended) with one exception. Nuckolls and Wood proposed in 2002 [1] that, as with the "fast ignition" scheme, a nanosecond-long laser pulse will produce approximately 1000 times solid state density deuterium-tritium (DT) plasma, on which a picosecond (ps)-long laser pulse acts, producing a highly intense relativistic electron beam of 5 MeV electron energy. When this electron beam acts on a volume of solid DT of at least 12 times solid state density, a fusion detonation wave is generated in this volume, in which ten thousand times more energy is produced than laser energy is consumed, according to theoretical estimates without further numerical data or implementation known from experimentation.

The need for very high energy yields consists in the fact that with pulsed operation in a fusion power plant that operates using lasers, fusion energy up to the gigajoule range (GJ=278 kWh) or higher per reaction per second is generated if at all possible, for reasons of cost. It should be noted that the shock effect caused by the pulse of the nuclear reaction is about 3000 times lower than that of a chemical explosion. In this connection, fusion yields obtained with laser pulses of up to 100 kJ of energy and ps duration as in the system of Nuckolls and Wood [1] are of interest. This is different from all other laser-fusion arrangements with yields below 500.

Also of particular interest is the fusion reaction of the hydrogen nuclei (H, protons p) with the boron isotope 11, which is referred to as the HB11 reaction. Each HB11 reaction produces three helium nuclei (alpha particles) with an energy gain of 8.9 MeV. This energy can be converted into heat or electrical energy. The HB11 reaction offers particular advantages in terms of high energy yield, avoiding the radiation problems of D-T fusion and a virtually inexhaustible availability of raw materials. And the HB11 reaction generates less radioactivity per unit of energy produced than the burning of coal, so radioactivity is no problem and can be disregarded.

The combination of laser nuclear fusion with magnetic fields is well known, although with the existing magnetic fields below 100 tesla, yields of less than 100 must be expected. The laser effect on solid state density fusion fuel using laser pulses of around ps duration or less is used for generating a cylindrical reaction zone, for which fusion is obtained only with said low yields. The use of magnetic fields was originally introduced in order to curb cylindrical radial losses, after the ps laser pulses for initiating a fusion flame by igniting an ultrahigh accelerated plasma by the nonlinear force of an extended plane geometry had to be restricted to a limited range of interaction—in contrast to the Nuckolls-Wood process—and the geometry was to extend in a cylindrical area under the interaction cross section, avoiding radial losses. These lateral losses could alternatively be eliminated by using a spherical geometry, as was published. In that case, for the reaction of boron isotope 11 with light hydrogen (HB11) in solid state density, only a maximum of all the fuel in the sphere could supply energy, wherein, as in other cases, the yield was limited and exawatt (EW) laser pulses were necessary.

It is known, in particular, to initiate the HB11 reaction by laser irradiation of a fusion fuel. With laser-based nuclear fusion, originally thermal processes involving an extremely rapid heating of targets at very high thermal pressures for the thermal ignition of fusion reactions were proposed. Using the most powerful lasers in the world, such as those at Livermore (Calif., USA), laser pulses with a duration of nanoseconds (ns) achieve yields close to breakthrough for a fusion reactor with DT.

Furthermore, departing from thermal methods, it has been found that laser energy can be converted directly into mechanical plasma motion, thereby avoiding complicated heating processes, radiation. instabilities and delayed thermal transitions of electrons to the pressure-generating plasma ions (block ignition). This concept is derived from the ponderomotive force, discovered by Kelvin, by which electrically uncharged bodies can be moved by means of electric fields, and the qualification thereof as a non-linear force which is based on the generation of high-frequency electric fields, wherein the optical properties of plasmas had to be generalized by means of Maxwell's stress tensor [2] [4] [5].

Based on measurements of the laser-plasma interaction, non-linear force was introduced on the basis of the optical properties of the high temperature plasmas generated by lasers in the irradiation of materials, with application to ordinary and relativistic self-focusing and plasma motion. However, it was determined [5] (see FIG. 1 of [4]) that in order to ignite a fusion reaction of deuterium and tritium, an energy flux density of 100 million joules per square centimeter would be required within a time of one picosecond (ps), which could not be achieved using the laser sources available for practical use during the 1970's.

In 1978, plasma hydrodynamic simulations demonstrated how laser pulses of 1.5 ps duration and a realistic intensity at that time of $10^{18}$ W/cm$^2$ could accelerate a 20 wavelength thick layer of deuterium plasma to velocities of $10^9$ cm/s [9]. These were ultrahigh accelerations of more than $10^{20}$ cm/s$^2$. Confirmation of these ultrahigh accelerations through experimentation was possible only after the introduction of the CPA method (chirped pulse amplification) for generating ultrashort laser pulses. Since that time, laser intensity (without self-focusing) has increased by ten million times. In ps laser pulses or even shorter laser pulses, the measured power reaches 10 PW (petawatt). With ultrashort laser pulses, the acceleration of plasma blocks in the range of $2\times10^{20}$ cm/s$^2$ was directly visibly measured with a Doppler shift of spectral lines [3], which corresponded to theoretical simulations [4], [4]. In a summary of these results [5], it was found that when hydrogen-boron (HB11) is used as a fusion fuel instead of D-T, the thresholds for laser ignition were about the same. That came as a big surprise and was possible only because the ps laser pulses provided the non-thermal direct conversion of laser energy to fusion, as opposed to the thermally compressive ignition achieved with ns laser pulses.

These computations for HB11 took into account only the binary reactions as in the computations for the D-T reaction. The HB11 reaction, however, produces a secondary reaction following the primary reaction, by elastic collisions of the resulting alpha particles with boron nuclei, causing an avalanche process with much higher reaction yields than with D-T. Furthermore, reactions in plane geometry were expected. For a fusion reactor, however the lateral losses must be considered. The simplest solution is to use spherical geometry. If solid state density fusion fuel is used, however, it is found for both DT and HB11 that for energy yields of up to 100, the necessary power of the radiated laser pulses lies not in the range of petawatts but in the thousands of times higher exawatt range, which can be achieved using current high performance laser sources. For example, a nuclear fusion reactor is proposed, which has negligible radioactivity by laser-driven plasma block ignition of solid state density or moderately compressed fuel, in which the lateral limitation of the reaction is achieved by using magnetic fields and/or a cladding that has a high atomic weight.

For the block ignition of nuclear fusion with ps-PW laser pulses, it is known that the ultrahigh plasma acceleration by non-force [2] calculated in 1978 was measured by Sauerbrey [3] in precise conformity [4], and those for initiation of a fusion flame were reproduced with the same threshold values for energy flux density for D-'I' fusion. The same high energy flux densities were obtained for HB11 fusion [5], solely for binary reactions as for DT. The use of classic magnetic fields with cylindrical geometry up to nearly 100 tesla was found to be insufficient for reducing the lateral losses from he reaction. For spherical geometry it was found that yields of only about 100 were achieved for HB11 reactions using at least exawatt pulses, even when in addition to the binary reactions the avalanche multiplication was included [6].

In [7], a laser-based nuclear fusion reaction is known, in which fusion fuel in the form of capsules is held with a magnetic field strength of 350 tesla. The nuclear fusion reaction is thermal, with laser pulses with a duration in the ns range being used.

OBJECT OF THE INVENTION

An object of the invention is to provide an improved method for generating electrical energy by nuclear fusion which avoids the drawbacks and limitations of conventional methods and which is characterized in particular by an increased energy yield and simplified implementation in practice. Another object of the invention is to provide an improved nuclear fusion reactor, with which the drawbacks and limitations of conventional techniques can be avoided, and which is characterized in particular by a simplified, practically implementable structure.

SUMMARY OF THE INVENTION

These objects are achieved by a method for generating electrical energy and a nuclear fusion reactor having the features of the independent claims. Advantageous embodiments and uses of the invention result from the dependent claims.

According to a first broad aspect of the invention, the above object is achieved by a method for generating electrical energy by means of inertial nuclear fusion (inertial confinement fusion) in which a fusion fuel, preferably comprising hydrogen and boron 11, is held within a magnetic field in a cylindrical reaction chamber, and a nuclear fusion reaction is initiated in the fusion fuel by using fusion laser pulses (also referred to as block fusion laser pulses), the pulse duration of which is less than 10 ps and the power of which is more than 1 petawatt. The energy released during nuclear fusion from the nuclei that are produced is converted into electrical energy. According to the invention, the magnetic field has a field strength which is greater than or equal to 1 kilotesla. The nuclear fusion preferably produces an energy yield of more than 500, in particular tore than 1000 per laser energy of the fusion laser pulses used to initiate the fusion flame. The tern fusion flame refers to the fusion reaction by picosecond initiation with block ignition (as distinguished from thermal fusion detonation).

According to a second general aspect of the invention, the above object is achieved by a nuclear fusion reactor, which is configured for generating electrical energy, and a magnetic field device which is configured for holding fusion fuel and for generating a magnetic field in a cylindrical reaction chamber, a fusion laser pulse source, configured for emitting fusion laser pulses having a pulse duration of less than 10 ps and a power of more than 1 petawatt and for initiating nuclear fusion in the fusion fuel, and an energy conversion device, which is provided for converting the energy released in the nuclear fusion reaction from the nuclei that are produced into power plant power. The magnetic field device is preferably configured to hold the fusion fuel by means of electrically insulating fibers, e.g. made of quartz. According to the invention, the magnetic field device is configured for generating the magnetic field with a field strength that is greater than or equal to 1 kT.

According to the invention, magnetic fields having a field strength of equal to or greater than kilotesia are preferably used, with the fields more preferably being controlled by a laser-controlled discharge. Advantageously, with the magnetic fields used according to the invention, for the first time he radial losses from a magnetic cylindrical reaction chamber of HB11 with consecutive reactions are prevented such that high yields particularly of greater than 1000 and much more are achieved, with the ps laser pulses having a particularly preferred power of a least 10 PW. The inventors have found tha the magnetic fields are suitable for reliably containing the expansion of the reaction volume during ignition of the nuclear fusion.

The invention offers the advantage of providing, for the first time, a realistic and economically feasible realization of a fusion-based, practically inexhaustible and inexpensive energy source. The nuclear fusion reactor according to the invention is a fusion power plant for practical use. The invention provides highly efficient laser nuclear fusion with magnetic channeling, in which laser-powered nuclear fusion is achieved with yields greater than 500 by applying extremely high magnetic fields.

Advantageously, the ultrahigh magnetic fields [8] of greater than one kilotesla, previously known in only one case, are used, as compared with conventional methods for generating a more than thirty times higher magnetic field, however instead of fusion which is thermally driven in nanoseconds, a non-thermal block ignition achieved with picosecond pulses is used. In dramatic contrast to all previous methods and configurations, this method enables energy yields to be achieved which lead to the realization of economically operated power plants with overall negligible nuclear radiation.

According to preferred embodiments of the invention, the fusion fuel has at least one of the following features. According to a first variant, the fusion fuel preferably has a solid state density of up to 20 times the compression as compared with uncompressed fuel, similar to the case of "fast ignition" according to Nuckolls et al. [1]. According to a further variant, the fusion fuel preferably consists of 11B isotopes with up to a 15% deviation of light hydrogen in terms of stoichiometry. According to a further variant, the fusion fuel preferably consists of a mixture of light hydrogen and boron, each in at least a 20% atomic concentration.

If, accord g to a further advantageous embodiment of the invention, the energy of the nuclei generated is captured by electrostatic fields, further advantages in terms of energy yield are achieved. The fusion energy can be converted directly into electrical energy. Preferably, the kinetic energy of the alpha particles produced is converted directly into electrical energy.

To generate the electrostatic fields, the reaction chamber, more particularly the magnetic field device for forming the reaction chamber, is preferably surrounded by the energy conversion device, the reaction chamber having a negative high voltage relative to the energy conversion device. For this purpose, the reaction chamber, in particular the magnetic field device, is preferably connected to a high voltage source for generating a negative high voltage relative to the energy conversion device. Particularly preferably, the negative high voltage is at least 1 MV.

If, according to a further variant of the invention, the energy conversion device is at ground potential, advantages with respect to the configuration of the nuclear fusion reactor and the feeding thereof with fusion fuel are achieved. The energy conversion device is preferably in the form of a spherical, electrically conductive enclosure (housing) around the reaction chamber, in particular the magnetic field. Advantageously, the energy conversion device is thereby optimally adapted to the fusion geometry.

Particularly preferably, between the energy conversion device and the reaction chamber a Faraday cage is provided for shielding the static high voltage field from the reaction processes, preventing any penetration of the high-voltage field into the fusion reaction volume.

The magnetic field having a field strength of greater than or equal to 1 kilotesla can be realized by any available method for generating strong magnetic fields. According to a particularly preferred embodiment of the invention, the magnetic field is generated by means of an interaction with discharge laser radiation by a discharge current in electrodes which are coupled via at least one coil, in particular a single coil winding. The magnetic field device of the nuclear fusion reactor preferably has a pair of electrodes, two coils and a magnetic field pulsed laser source, which is provided for irradiating the electrodes with discharge laser radiation. Preferably, the magnetic field device is configured to hold the fusion fuel by means of electrically insulating fibers, z. B. made of quartz, on the coils or other support elements of the magnetic field device. Particularly preferably, the magnetic field device is implemented with the configuration described in [8] by S. Fujioka, et al. The discharge laser radiation preferably comprises laser pulses (hereinafter: magnetic field generating laser pulses or magnetic field laser pulses) having a pulse duration of less than 20 ns and energy of more than 100 J.

Advantageously, according to a further embodiment of the invention, the magnetic field can be intensified by designing the electrodes for generating the magnetic field to comprise two plates spaced from one another, between which a magnetic field laser pulse absorbing material is arranged, the form of which is adapted to a Rayleigh profile of generated plasma. The material particularly preferably comprises a foam material, such as polyethylene, and the bi-Rayleigh profile of electron density according to FIG. 10.17 of [2] (see FIG. 1 of [4]) is selected.

According to a further, particularly advantageous embodiment of the invention, block ignition is initiated by the fusion laser pulses. For this purpose, the fusion laser pulses preferably have a duration of less than 5 ps and/or a power of at least 1 petawatt. The fusion pulsed laser source for generating the fusion laser pulses having a duration of less than 5 ps preferably comprises the same type of source as the 10 PW-ps laser assembly known from the Institute of Laser Engineering at Osaka University.

The fusion laser pulses preferably have a contrast ratio of at least $10^6$. To achieve this, advance pulses are particularly preferably suppressed up to a time of less than 5 picoseconds before the arrival of a (main) fusion laser pulse at the fusion fuel. Furthermore, benefits in terms of triggering the fusion reaction result when the fusion laser pulses have an intensity of at least $10^{17}$ watts per square centimeter upon arrival at the fusion fuel.

According to a further advantageous embodiment of the invention, the fusion fuel is partially or fully encapsulated by a cover layer, particularly on the side of laser-plasma interaction, the cover layer being made of a material which has an atomic weight of greater than 100. The pulse transmission for generating the fusion flame in the reaction fuel is advantageously increased as a result. The cover layer preferably has a thickness equal to or less than 5 microns, and/or it may be formed by vapor deposition.

BRIEF DESCRIPTION OF THE FIGURES

Further details and advantages of the invention will be explained below with reference to the accompanying drawings. Shown are.

PREFERRED EMBODIMENTS OF THE INVENTION

Features of preferred embodiments of the invention are described below primarily with reference to the generation of the magnetic field for holding the fusion fuel and the design of the energy conversion device. Details the invention,such as the details of laser pulse sources, the physical principles of the HB11 reaction, the connection of the fusion reactor to other components of a power plant, in particular for preparing and delivering the fusion fuel, for controlling the fusion reactor, for protecting; the environment against thermal effects and/or electric fields, are not described, as these can be realized by a person skilled in the art based on his/her knowledge of known fusion and plasma physics and conventional power plant engineering, depending on the specific conditions of use of the invention. Reference is made by way of example to a fusion reactor having a single reaction chamber. However, the invention is not limited to this design. Rather, a fusion reactor be equipped with a plurality of reaction chambers, each having a magnetic field device for holding fusion fuel. The reaction chambers may be operated alternatingly in sequence so as to enable a continuous or quasi-continuous generation of electrical energy.

Figure 1:
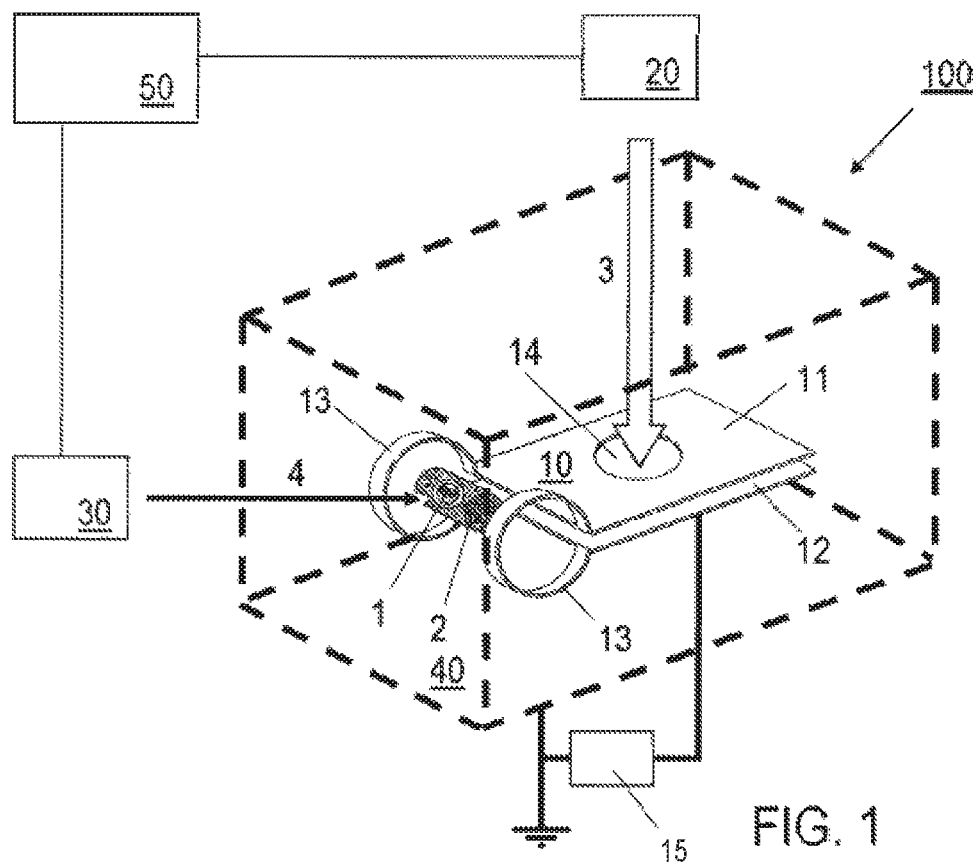
FIG. 1: a schematic illustration of one embodiment of e nuclear fusion reactor of the invention.

FIG. 1 shows a schematic illustration of one embodiment of the nuclear fusion reactor 100 of the invention, which comprises a magnetic field device 10 for holding a fusion fuel 1 with a magnetic field in a cylindrical reaction chamber 2, a magnetic field pulsed laser source 20 for emitting magnetic field laser pulses 3 (or: magnetic field generating laser pulses), a fusion pulsed laser source 30 for emitting fusion laser pulses 4 (or: block fusion laser pulses) and an energy conversion device 40 for converting the energy that is released from the nuclei that are produced during nuclear fusion.

The magnetic field device 10 for generating a magnetic field having a strength of e.g. 4.5 kT in reaction chamber 2 comprises two parallel metal plates 11, 12 made of nickel, for example, and having a thickness of e.g. 2 mm and a characteristic expansion of e.g. 3 cm. The metal plates 11, 12 are connected to one another via electrical conductors, which form two windings 13 of a coil. One of the metal plates 11 has an opening 14 through which the magnetic field laser pulse 3 is beamed with a duration of, for example, 1 ns to 2 ns, and e.g. 10 kJ of energy. The plasma produced by each magnetic field laser pulse 3 generates a current surge in the windings 13 with a magnetic field having a volume of a few cubic millimeters and several ns duration.

Opening 14 is a circular opening in the upper metal plate 11 in FIG. 1. The diameter and optionally also the geometric shape of opening 14 are selected based on the properties, in particular the intensity, the diameter and the profile, of the magnetic field laser pulses 3. The diameter of opening 14 is 5 mm, for example. Rather than the circular shape, an elliptical shape may also be provided. Opening 14 may be optimized with a view to maximizing the magnetic field for a maximum fusion yield.

The second metal plate 12, which faces opening 14, can be provided with an absorption layer which serves to reduce the optical reflection of the magnetic field laser pulses 3 and to increase the dielectric properties of the capacitor formed by the metal plates 11. The absorption layer (not shown) is preferably disposed over the entire surface of the metal plate 12, and is more preferably made of a foam material, for example polyethylene. The foam material is selected such that after laser irradiation, an electron density distribution is formed as a bi-Rayleigh profile.

The magnetic field laser pulses 3 are generated by the schematically illustrated magnetic field pulsed laser source 20, which contains, for example, a Nd-YAG laser and other optical components (not shown) for directing the magnetic field laser pulses 3 toward the magnetic field device 10. The duration of the magnetic field laser pulses 3 may optionally be shortened by a time in the nanosecond range by using an iodine laser having a pulse length of 100 ps, and/or with shorter laser pulses following a CPA power increase. The: magnetic field generated by the magnetic field device 10 can thereby be advantageously intensified.

The fusion pulsed laser source 30 is configured rate the fusion laser pulses 4 with a duration of less than 5 ps and an intensity in excess of $10^{19}$ W/cm$^2$. The fusion laser pulses 4 preferably have a contrast ratio of at least $10^6$ for the duration of less than 5 ps prior to the arrival of the fusion laser pulses 4 at fusion fuel 1. In addition, the fusion laser pulses 4 preferably have an intensity distribution with less than 5% fluctuation over the beam cross section, except in an outer 5% border region of the beam cross section. The block ignition of the fusion reaction in fusion fuel 1 is thereby advantageously optimized. This intensity distribution is achieved, for example, by a fusion pulsed laser source 30 which has a bundle of fiber amplifiers, each individual fiber having a single mode emission. The fusion pulsed laser source 30 further contains a pulsed laser, such as a solid state pulsed laser, for generating ps laser pulses.

The magnetic field pulsed laser source 20 and the fusion pulsed laser source 30 are coupled to a control unit 50. Control unit 50 is configured such that the magnetic field laser pulses 3 and the fusion laser pulses 4 are synchronized with one another. In reaction chamber 2, the maximum magnetic field is generated immediately before each fusion laser pulse 4 arrives at fusion fuel 1.

Fusion fuel 1 is a solid state, cylindrical body, based on HB11, for example, and having a length of 1 cm and a diameter of 0.2 mm. The surface of fusion fuel 1 has a cover layer over the laser interaction surface which has a thickness of three laser vacuum wavelengths. The top cover layer consists of elements having an atomic weight greater than 100, for example, silver. The cover layer improves pulse transmission for generating the fusion flame in fusion fuel 1. Fusion fuel 1 is held in the magnetic field device by means of quartz fibers.

Energy conversion device 40 generally comprises an electrically conductive component (indicated schematically by dashed lines in FIG. 1; see also FIG. 3), which surrounds magnetic field device 10 on all sides. Magnetic field device 10 is supported inside energy conversion device 40 (support not shown in FIG. 1; see, for example, support bar 44 in FIG. 3). Energy conversion device 40 is preferably connected to ground potential, while a negative high voltage, for example −1.4 MV, is applied to magnetic field device 10 by means of a voltage source 15. Energy conversion device 40 is configured to capture high-energy He nuclei (alpha particles) released during the fusion reaction of fusion fuel 1, and convert them by means of high voltage direct current transmission (HVDC) [9] into a discharge current. The discharge current supplies the electrical energy into which the energy released in the fusion reaction is converted.

Figure 2:
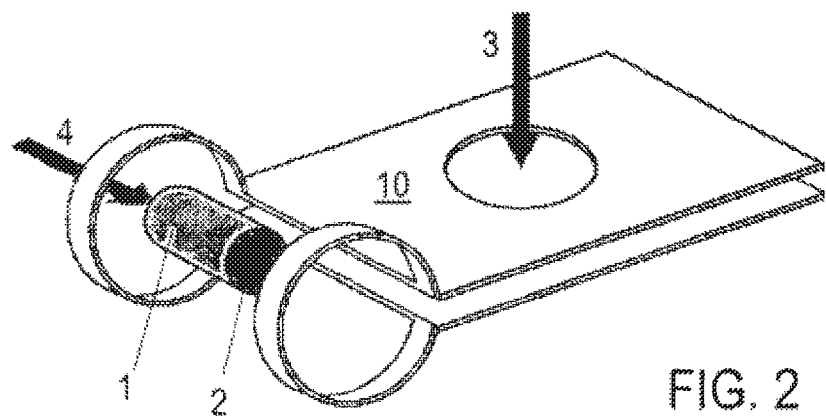
FIG. 2: a schematic illustration of the irradiation of a magnetic field device with magnetic field pulses and fusion laser pulses.

The arrival of the magnetic field laser pulses 3 and fusion laser pulses 4 at the reaction unit formed by magnetic field device 10, is also illustrated in FIG. 2. Magnetic field device 10 is configured as described above in reference to FIG. 1. The magnetic field generating laser pulses 3 generate a magnetic field having a field strength of 10 kT, for example. Fusion fuel 1 is placed (and held in place by the quartz fibers) within axis 1 of reaction chamber 2, which is the same as the axis of the magnetic field, and is acted on by a magnetic field within a time range of nanoseconds. During the period in which the magnetic field is generated, a block ignition is generated in fusion fuel 1 by means of fusion laser pulse 4. Fusion laser pulse 4 has an energy of 30 kJ, for example (equivalent to 30 PW power), so that the products of the nuclear fusion (helium nuclei) have an energy output of about 1 GJ. This energy is converted electrostatically by energy conversion device 40, with low heat loss, into electric power (1 GJ is equivalent to around 280 kWh). This advantageously enables fusion reactor 100 to economically supply a high electric current, even at a low reaction rate of one reaction per second. The fusion reaction destroys magnetic field device 10 by the action of the fusion products, so that for the subsequent fusion reaction, another magnetic field device 10 loaded with fusion fuel must be supplied.

In contrast to the diagrams in FIGS. 1 and 2, the direction of incidence of the magnetic field generating laser pulses 3 can be rotated by an angle of up to 80° between the vertical incidence in the plane spanned by the vertical direction of incidence and the normal plane of the magnetic field, with rotation occurring in the plane which is oriented parallel to the coils 13.

Figure 3:
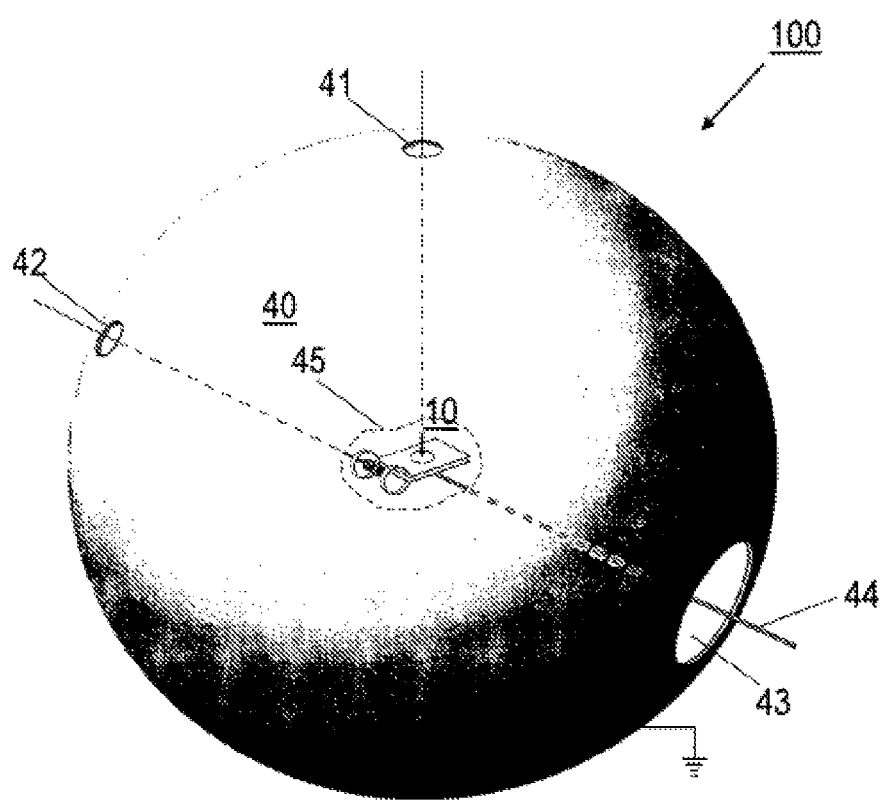
FIG. 3: further details of one embodiment of the nuclear fusion reactor of the invention.

Further details of an embodiment of the nuclear fusion reactor 100 according to the invention are shown in FIG. 3. In this embodiment of the invention, energy conversion device 40 comprises an electrically conductive sphere, at the center of which magnetic field device 10 of FIGS. 1 and 2 is arranged. Energy conversion device 40 is made, for example, of stainless steel having a thickness of 10 mm and a diameter of at least 1 m. The spherical outer vessel of the reactor must be large enough and its walls must be thick enough to withstand the mechanical shock of the fusion reaction. This results in the advantage that the mechanical pressure amounts to the root of the energy of the nuclear reaction divided by the energy produced in chemical reactions, which is a factor of approximately 3000. The shock on the wall of the sphere transferred by the pulse of the total of generated alpha particles is then equivalent to the explosion of approximately 5 grams of TNT.

In a practical embodiment of the invention, all components of fusion reactor 100 are formed with rounded surfaces, which are free of corners and edges. A field emission of electrons and the formation of dark discharges is thereby advantageously avoided. The entire assembly is located under a high vacuum generated by vacuum pumps (not shown).

The spherical surface of energy conversion device 40 has a plurality of windows, which comprise a first window 41 for beaming in the magnetic field laser pulses 3, a second window 42 for beaming in the fusion laser pulses 4 and a third window 43 for loading he energy conversion device 40 with the magnetic fi Id device 10 and the fusion fuel 1. Since the interior of energy conversion device 40 is evacuated, the first windows 41 and second windows 42 are formed by pressure-tight, transparent panes, for example, of glass. The third window 43 is open and coupled in a pressure tight connection to an adjacent container, and is used for supplying and supporting he central magnetic field device 10 (reaction unit). This is provided on a rod-shaped fuel carrier 44, which is loaded outside of the energy conversion device 40 with fusion fuel 1, and is inserted and positioned at the center of the sphere, particularly freely floating. Fuel carrier 44 and magnetic field device 10 are located, at a potential of −1.4 MV relative to energy conversion device 40, at ground potential. Fuel carrier 44 is in the form, for example, of a rod with a length of at least one-half the diameter of energy conversion device 40.

Inside energy conversion device 40, a spherical or otherwise shaped, e.g. irregularly shaped, Faraday cage 45, is provided, which encloses magnetic field device 10. The Faraday cage 45, e.g. in the form of a mesh or grid, is designed to prevent the static high-current field from influencing the processes involved in generating the magnetic field of the magnetic field device. The energy conversion device 40 is shielded on all sides by the Faraday cage 45. Fuel carrier 44 with magnetic field device 10 and fusion fuel 1 at the electrical potential of 1.4 MV comes from the adjoining container, which is located electrically insulated in the same vacuum as the interior of the spherical energy conversion device 40, so that after each reaction, additional reactor units are brought into the center of the energy conversion device 40 at the same potential. Access to the interior for the loading units of the reaction is provided through air locks.

During continuous operation, magnetic field devices 10, loaded with fusion fuel 1, are introduced repeatedly in succession into energy conversion device 40, exposed to the magnetic field generating laser pulses for generating the magnetic field, and during generation of the magnetic field are exposed to the block fusion laser pulses for block fusion, and are then replaced by a new magnetic field device 10 loaded with fusion fuel 1.

The double charged alpha particles of the same energy (helium nuclei) generated with each fusion reaction reach the spherical energy conversion device 40 through the mesh of the Faraday cage 45 and release their kinetic energy to the energy conversion device 40. At the potential of −1.4 MV the energy of the alpha particles is available, and at a charge −1.4 MV the energy is supplied as a seconds long discharge current of 714 Amperes by means of the high voltage direct current transmission technique known from [9]. The high voltage direct current is converted into conventional three-phase alternating current in a known manner, as in HVDC technology [9].

The same energy of all alpha particles of 2.9 MeV generated in the fusion process is widened by a secondary avalanche reaction to a spectrum of both higher and lower energies, thereby advantageously improving the energy yield of energy conversion by a few percent more.

Refilling for a subsequent reaction at the potential of −1.4 million volts can then be accomplished within only seconds with the prepared fixation of the adjustment of the laser pulses toward the central reaction unit of FIG. 2. Before it is introduced into the reactor sphere (energy conversion device 40), the remains from the preceding reaction can be removed. The cost of each new unit including the HB11 fusion fuel can be held to a fraction of the overhead costs of the generated electrical energy.

The features of the invention disclosed in the foregoing description, the drawings and the claims, taken alone, in combination or in sub-combinations, are considered essential to implementing the various embodiments of the invention.

The invention claimed is:

1. A nuclear fusion reactor, comprising:
 a fusion pulsed laser source, which is configured to emit fusion laser pulses having a pulse duration of less than 10 ps and power of more than 1 petawatt and to directly initiate a nuclear fusion reaction in a fusion fuel within a cylindrical reaction volume:
 a magnetic field pulsed laser source, which is configured to generate magnetic field laser pulses to generate a magnetic field in the cylindrical reaction volume to contain the nuclear fusion reaction, the magnetic field being generated at a field strength of greater than or equal to 1 kT;
 an energy conversion device operable to convert any energy released during the nuclear fusion reaction into electrical energy.

2. The nuclear fusion reactor according to claim 1, wherein a magnetic field device is exposed to magnetic field laser pulses to generate the magnetic field within the reaction volume which is surrounded by the energy conversion device and wherein the magnetic field device is connected to a voltage source for generating a negative high voltage relative to the energy conversion device.

3. The nuclear fusion reactor according to claim 2, wherein;
 the energy conversion device is at ground potential;
 the energy conversion device forms a spherical, electrically conductive enclosure for the magnetic field device;
 between the energy conversion device and the reaction volume, a Faraday cage is provided for shielding a static high current field from the nuclear fusion reaction; or
 the voltage source is configured for generating the negative high voltage in an amount of at least 1 MV.

4. The nuclear fusion reactor according to claim 2, wherein the magnetic field device comprises:
 a pair of electrodes which are coupled to coils; and
 the magnetic field pulsed laser source, which is positioned for irradiating the electrodes with the magnetic field laser pulses, wherein the magnetic field can be generated by a discharge current in the electrodes and coils by interaction with the magnetic field laser pulses.

5. The nuclear fusion reactor according to claim 4, wherein the magnetic field pulsed laser source is configured for generating the magnetic field laser pulses in the form of laser pulses having a pulse duration of less than 20 ns and energy of more than 100 J.

6. The nuclear fusion reactor according to claim 4, wherein the magnetic field pulsed laser source is positioned so the magnetic field laser pulses have a direction of incidence with respect to the magnetic field device, wherein the direction of incidence deviates up to 80° from vertical within a plane oriented parallel to the coils.

7. The nuclear fusion reactor according to claim 4, wherein the electrodes of the magnetic field device comprise two plates spaced from one another, between which a field intensifying material is arranged in a shape which is adapted to a Rayleigh profile of the generated plasma.

8. The nuclear fusion reactor according to claim 1, wherein the fusion pulsed laser source is configured for generating the fusion laser pulses, the duration of which is less than 5 ps.

9. The nuclear fusion reactor according to claim 4, wherein the fusion pulsed laser source is positioned so the fusion laser pulses have a contrast ratio of at least $10^6$ or the fusion laser pulses have an intensity of at least $10^{17}$ watts per square centimeter.

* * * * *